United States Patent
Wang et al.

(10) Patent No.: US 11,622,169 B1
(45) Date of Patent: Apr. 4, 2023

(54) PICTURE PROCESSING METHOD IN EMBEDDED SYSTEM

(71) Applicant: SOOCHOW UNIVERSITY, Suzhou (CN)

(72) Inventors: Yihuai Wang, Suzhou (CN); Chunping Liu, Suzhou (CN); Jin Wang, Suzhou (CN); Lianmin Shi, Suzhou (CN); Zhanpeng Hu, Suzhou (CN); Cheng Chang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/802,073

(22) PCT Filed: Oct. 9, 2021

(86) PCT No.: PCT/CN2021/122782
§ 371 (c)(1),
(2) Date: Aug. 24, 2022

(87) PCT Pub. No.: WO2022/237062
PCT Pub. Date: Nov. 17, 2022

(30) Foreign Application Priority Data

May 10, 2021 (CN) .......................... 202110505643.1

(51) Int. Cl.
*G06T 5/00* (2006.01)
*H04N 23/60* (2023.01)
(Continued)

(52) U.S. Cl.
CPC ............. *H04N 23/60* (2023.01); *G06T 5/002* (2013.01); *G06T 5/20* (2013.01); *G06T 5/40* (2013.01);
(Continued)

(58) Field of Classification Search
CPC .......... H04N 23/60; G06T 5/002; G06T 5/20; G06T 5/40; G06T 7/194; G06T 9/00; G06T 2207/20024; G09G 3/36
(Continued)

(56) References Cited

U.S. PATENT DOCUMENTS

2019/0206115 A1* 7/2019 Tytgat .................... G06T 15/20

FOREIGN PATENT DOCUMENTS

| CN | 110222760 A | 9/2019 |
| CN | 111401139 A | 7/2020 |

(Continued)

*Primary Examiner* — Stephen P Coleman
(74) *Attorney, Agent, or Firm* — SZDC Law P.C.

(57) ABSTRACT

An embodiment of the present invention provides a picture processing method in an embedded system. The picture processing method includes: performing a bit setting operation on an input/output register corresponding to a communication GPIO port of a camera module in the embedded system, so as to improve a picture collection speed of the camera module; compressing a collected picture using a preset picture compression algorithm and transmitting the compressed picture to a picture preprocessing unit in the embedded system; and filtering out, by the picture preprocessing unit, a picture background using a preset filtering algorithm to obtain picture features of a target object in the picture. With the picture processing method, requirements for an occupied memory resource are balanced while a picture collection speed and a picture data processing speed are increased.

8 Claims, 3 Drawing Sheets

(51) Int. Cl.
*G06T 5/20* (2006.01)
*G06T 7/194* (2017.01)
*G06T 9/00* (2006.01)
*G09G 3/36* (2006.01)
*G06T 5/40* (2006.01)

(52) U.S. Cl.
CPC ............... *G06T 7/194* (2017.01); *G06T 9/00* (2013.01); *G09G 3/36* (2013.01); *G06T 2207/20024* (2013.01)

(58) Field of Classification Search
USPC ...................................................... 348/222.1
See application file for complete search history.

(56) References Cited

FOREIGN PATENT DOCUMENTS

| | | |
|---|---|---|
| CN | 113112431 A | 7/2021 |
| EP | 3264372 A1 | 1/2018 |

\* cited by examiner

PICTURE PROCESSING METHOD IN EMBEDDED SYSTEM

This application is the National Stage Application of PCT/CN2021/122782, filed on Oct. 9, 2021, which claims priority to Chinese Patent Application No. 202110505643.1, filed on May 10, 2021, which is incorporated by reference for all purposes as if fully set forth herein.

FIELD OF THE DISCLOSURE

The present invention relates to the field of embedded artificial intelligence technologies, and particularly to a picture processing method in an embedded system.

BACKGROUND OF THE DISCLOSURE

Embedded artificial intelligence (EAI) is a product of deeply integrating an embedded computer technology, an artificial intelligence technology and actual requirements in each application scenario. Besides technical advantages of artificial intelligence, the EAI has characteristics of an excellent real-time performance, applicability, robustness and stability of the embedded technology.

A picture is a data pattern most consistent with human intuitive vision. As the technology develops, in embedded systems, picture data is increasingly taken as a form of data input and data output. How to balance a relationship among quality of an input picture, a picture collection speed and a memory resource of the embedded system occupied by a reasoning process is a key problem of the development of the EAI.

Therefore, in order to solve the above technical problems, it is necessary to provide a picture processing method conforming to characteristics of memory of the embedded system, so as to improve the picture collection speed and a picture data processing speed and balance requirements for the occupied memory resource.

SUMMARY OF THE DISCLOSURE

In view of this, an object of the embodiment of the present invention is to provide a picture processing method conforming to characteristics of memory of an embedded system, in which a driver of a camera module in the embedded system is optimized, and picture data is compressed, so as to balance requirements for an occupied memory resource while increasing a picture collection speed and a picture data processing speed.

In order to achieve the above object, the technical solution provided by an embodiment of the present invention is as follows:

A picture processing method in an embedded system, comprising:

performing a bit setting operation on an input/output register corresponding to a communication GPIO port of a camera module in the embedded system, so as to improve a picture collection speed of the camera module;

compressing a collected picture using a preset picture compression algorithm and transmitting the compressed picture to a picture preprocessing unit in the embedded system; and filtering out, by the picture preprocessing unit, a picture background using a preset filtering algorithm to obtain picture features of a target object in the picture;

wherein in the picture processing method, each picture data frame is processed using a fusion rolling convolution algorithm which comprises:

T1: acquiring pixel data in first (k+H) rows of a picture frame, and storing the pixel data in a corresponding two-dimensional array $G[H+1][S]$, $k \in [1,T-H-1]$, a value of S being a single row size of the acquired data, and reception of the picture data being suspended by a corresponding control interface after the acquisition is finished;

T2: performing a convolution operation using a convolution kernel $A[H][H]$ and data from a kth row to a (k+H−1)th row of G, and storing an obtained feature layer array in the kth row of the feature layer array in sequence;

T3: exchanging members in the (k+1)th row to the (k+H)th row of the two-dimensional array G with members in the kth row to the (k+H)th row respectively; and sequentially exchanging elements in the adjacent kth row and (k+1)th row according to the sequence until all the elements are exchanged, and discarding the data in the original kth row;

T4: enabling a reading function of a cache chip, continuously reading picture data in a (k+H+1)th row, and storing the picture data in the (k+H)th row of G; and T5: increasing a value of k by 1, and repeating the steps T1, T2, T3 and T4 in sequence until convolution is completed to obtain a complete output array.

As a further improvement of the present invention, wherein when the camera module collects the picture, high 8-bit data of a pixel is read first, and then, and low 8-bit data of the pixel is read.

As a further improvement of the present invention, wherein the picture compression algorithm comprises:

cutting the collected picture to a preset standard size; and judging whether an input pixel with an ordinal number n is a target pixel, if yes, storing the pixel to a corresponding target two-dimensional array position Axy, and otherwise, discarding the pixel.

As a further improvement of the present invention, wherein the preset filtering algorithm comprises an edge averaging algorithm, a double-peak averaging algorithm, and a double-peak valley bottom algorithm.

As a further improvement of the present invention, wherein the edge averaging algorithm comprises: averaging all edge pixels to obtain an average value, and filtering the picture with the average value as a threshold.

As a further improvement of the present invention, wherein the double-peak averaging algorithm comprises: firstly processing an occurrence number of each gray value in an input picture into a form of a histogram, then performing double-peak judgment on the histogram, if yes, taking an average value of double peaks as a filtering threshold, if no, performing smoothing with a span of n on each data point, and meanwhile giving a smoothing number N, and if the upper limit N is exceeded, judging that the picture may not be filtered.

As a further improvement of the present invention, wherein the double-peak valley bottom algorithm comprises: firstly processing an occurrence number of each gray value in an input picture into a form of a histogram, then performing double-peak judgment on the histogram, if yes, taking a gray value of a lowest valley between two peaks as a threshold, filtering the picture using the threshold, if no, performing smoothing with a span of n on each data point, and meanwhile giving a smoothing number N, and if the upper limit N is exceeded, judging that the picture may not be filtered.

As a further improvement of the present invention, further comprising an LCD display acceleration step which comprises: setting an LCD display region, and calling a serial peripheral interface to directly send picture pixel data to an LCD.

The present invention has the following advantages.

The object of the embodiment of the present invention is to provide the picture processing method conforming to the characteristics of the memory of the embedded system, in which the driver of the camera module in the embedded system is optimized, and the picture data is compressed, so as to balance the requirements for the occupied memory resource while increasing the picture collection speed and the picture data processing speed. Further, in the picture processing method, LCD display of the picture is accelerated by setting the LCD display region. Further, in the picture processing method, the fusion rolling convolution algorithm is adopted in the picture processing process, which effectively saves a memory space required to be occupied in the picture processing process, such that the picture processing process is more suitable for a situation of shortage of the memory resource of the embedded system.

BRIEF DESCRIPTION OF DRAWINGS

In order to more clearly explain the technical solutions of the embodiments of the present invention or the prior art, the drawings to be used in the descriptions of the embodiments or the prior art are briefly introduced as follows. Apparently, the following drawings merely illustrate some embodiments of the present invention, and a person skilled in the art can obtain other drawings from these drawings without any creative effort.

DETAILED DESCRIPTION OF PREFERRED EMBODIMENTS

In order to make those skilled in the art better understand the technical solutions in the present invention, the following clearly and completely describes the technical solutions of the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
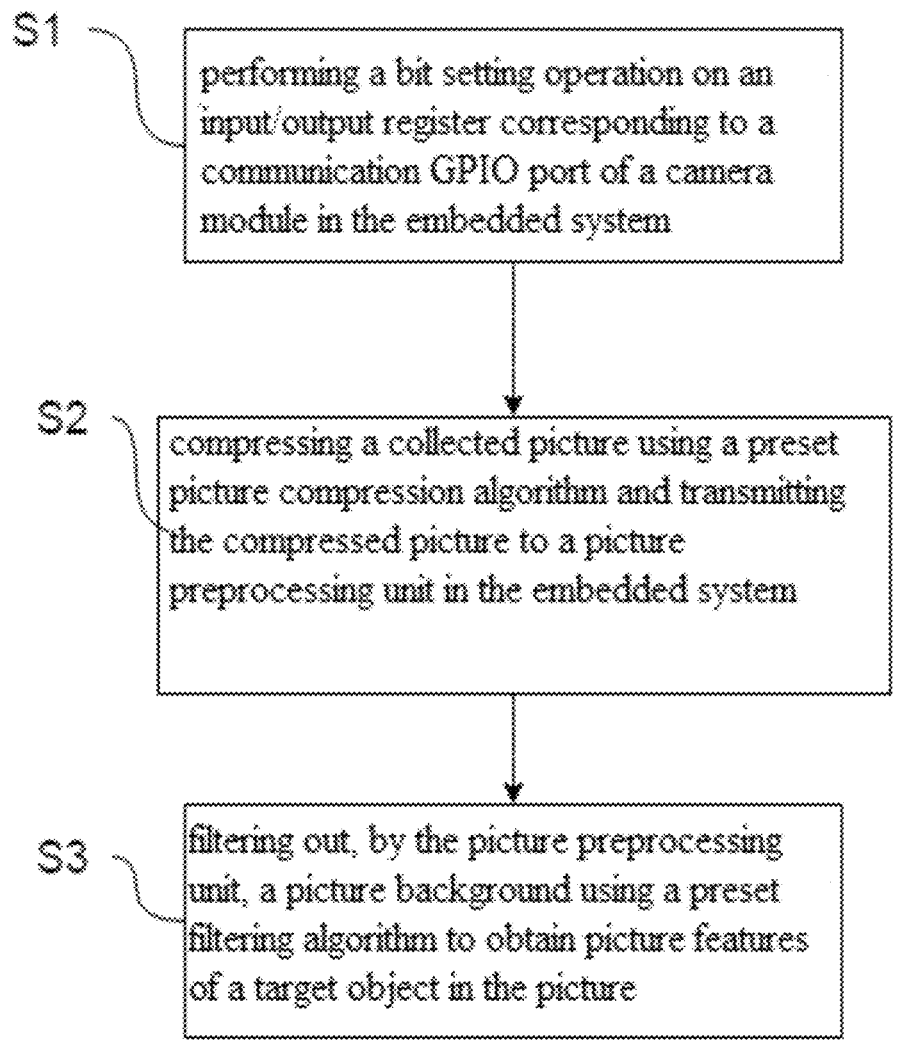
FIG. 1 is a schematic flow chart of a picture processing method of an embedded system according to an embodiment of the present invention.

FIG. 1 is a schematic flow chart of a picture processing method of an embedded system according to an embodiment of the present invention. In the present embodiment, the picture processing method of an embedded system includes three basic steps.

Step S1: performing a bit setting operation on an input/output register corresponding to a communication GPIO port of a camera module in the embedded system, so as to improve a picture collection speed of the camera module. This step may also be referred to simply as a step of optimizing driving of the camera module of the embedded system. Specific flow of this step is shown in FIG. 2.

Usually, the camera module has the picture collection flow that a cache chip is added between a main control chip and a camera to be matched with a receiving and sending speed; that is, the camera sends a complete picture data frame to the cache chip, and the cache chip closes a written function thereof after reception is completed, and then transmits picture data to the main control chip, this transmission process being dominated by the main control chip; after completely outputting the received picture data, the cache chip enables the written function to store a next picture sent by the camera, and the process is repeated. Although the method ensures that each pixel in a single picture may not be lost, one original GPIO reading operation of each pixel is changed into two reading operations, thus reducing a picture reading speed; excessive memory resources are occupied by directly and completely storing the picture and then processing the picture.

Figure 2:
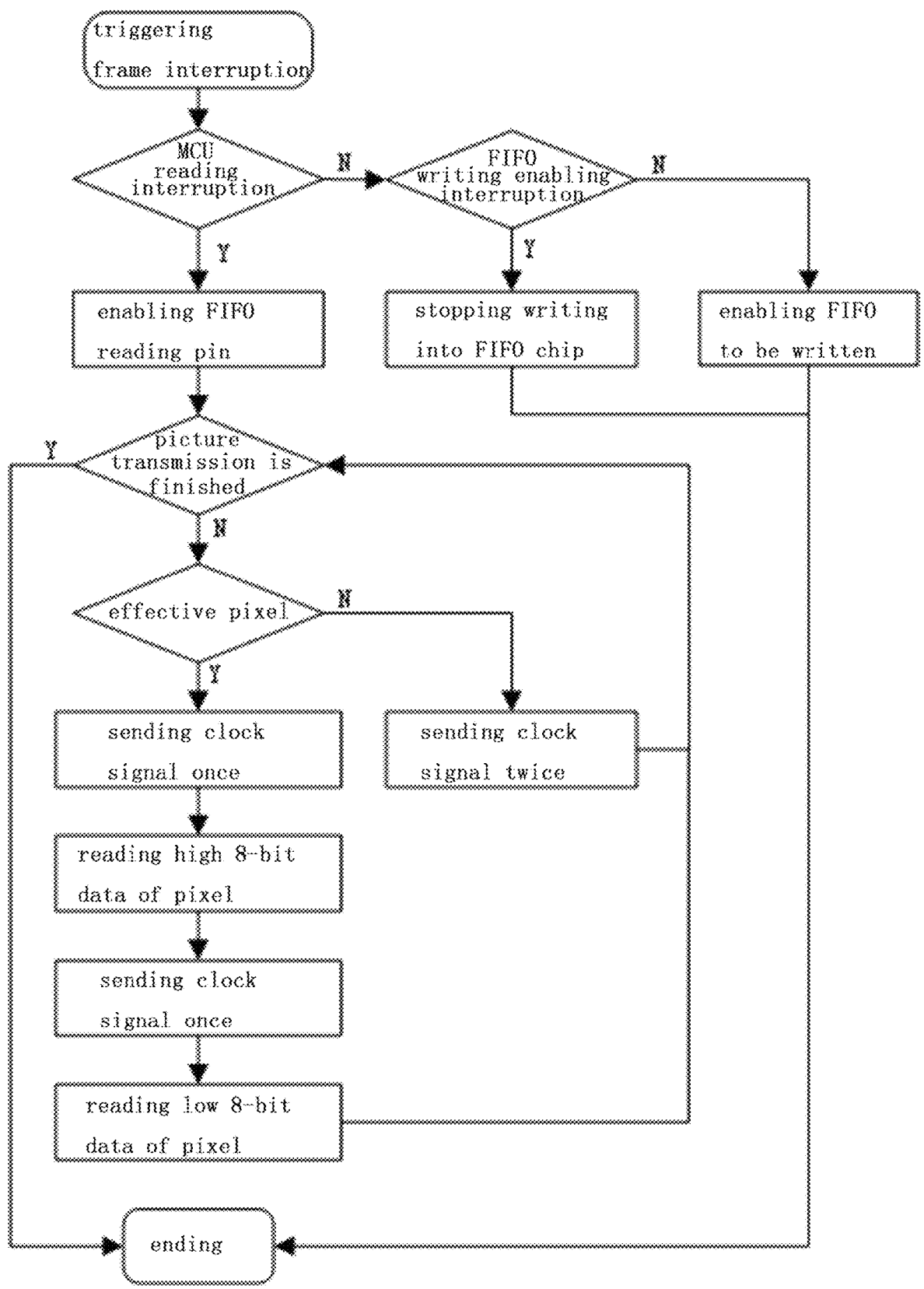
FIG. 2 is a schematic flow chart of optimizing driving of a camera in the embodiment shown in FIG. 1.

As shown in FIG. 2, in this embodiment, after the bit setting operation is performed on the input/output register corresponding to the communication GPIO port of the camera module in the embedded system, when the camera module collects the picture, high 8-bit data of the pixel is read first, and then, low 8-bit data of the pixel is read, thus avoiding transfer and judgment of parameters, and improving a picture collection efficiency and speed. In the picture collection process of the camera module, the picture reading and display speed may be increased while imaging quality is guaranteed, and occupation of a memory space may be reduced as much as possible.

Step S2: compressing the collected picture using a preset picture compression algorithm and transmitting the compressed picture to a picture preprocessing unit in the embedded system. In this embodiment, the picture compression algorithm includes:

step S21: cutting the collected picture to a preset standard size; the preset standard size being capable of being determined according to a condition of the embedded system, such as 60×60.

Step S22: judging whether an input pixel with an ordinal number n is a target pixel, if yes, storing the pixel to a corresponding target two-dimensional array position Axy, and otherwise, discarding the pixel.

A specific implementation is shown by the algorithm in table 1.

TABLE 1

| input picture compression algorithm |
|---|
| Input: pixel data $P_n$, pixel input ordinal number n, total picture number N=K×K, output array element row number x, column number y <br> Output: output picture array element $A_{xy}$ <br> Y=GreatestCommonDivisor(H,60) obtain greatest common divisor of H and 60 <br> get$P_n$ get nth pixel $P_n$ <br> forn=0,.. .,N-1 do perform compression judgment on each pixel <br>   ifn>=600&&n<=3000 then compress pixel in specified region <br>     locate$_n$=n%H <br>     iflocate$_n$=Ythen <br>       $A_{xy}$=$P_n$ <br>       x+=1 <br>   ifx=Hthen <br>     y+=1 <br> returnA |

Step S3: filtering out, by the picture preprocessing unit, a picture background using a preset filtering algorithm to obtain picture features of a target object in the picture. For a picture data set collected by the embedded system according to the above method, the collected picture background is not a 0 value, but a low gray value relative to the object, generally between 50 and 60. Although the value is only half of that of the object, a large part of the background may still interfere with an activation value, such that the picture background has to be filtered out for subsequent picture processing, and the picture features of the target object are kept as far as possible. In this embodiment, the preset filtering algorithm includes an edge averaging algorithm, a double-peak averaging algorithm, and a double-peak valley bottom algorithm.

In the process of collecting the picture data, most objects are located at relatively middle positions in the collected picture, such that edge pixels represent a gray scale of the background to a certain extent, and therefore, a very edge part is a reference set of gray scales which may be used as whole background color. According to this distribution characteristic, the edge averaging algorithm includes: averaging all the edge pixels to obtain an average value, and filtering the picture with the average value as a threshold. A specific implementation process of the edge averaging algorithm is shown in table 2.

TABLE 2

| edge averaging algorithm |
| --- |
| Input: original picture array origin_pic |
| Output: filtered picture array shreshold_pic |
| get origin_pic[28][28] get picture data |
| sum = origin_pic[0][ ] + origin_pic[ ][0] + origin_pic[27][ ] + origin_pic[ ][27] |
| shreshold=sum/112 obtain average threshold |
| for a∈origin_pic do |
| if a<shreshold then |
| assign 0 to any member in the array //perform threshold filtering on picture |
| return shreshold_pic |

The processed object and the background are two different objects in terms of object types, gray features presented on the same object tend to have continuity, and for a simple background, surface pixels tend to have different gray values due to uneven illumination distribution or refraction of light by a surface, such that according to such a characteristic, the background may be filtered using the double-peak averaging algorithm.

The double-peak averaging algorithm includes: firstly processing an occurrence number of each gray value in the input picture into a form of a histogram, then performing double-peak judgment on the histogram, that is, judging whether the histogram has and only has two local maximum values, if yes, taking an average value of the double peaks (i.e., the two local maximum values) as a filtering threshold, if no, performing smoothing with a span of n on each data point, and meanwhile giving a smoothing number N, and if the upper limit N is exceeded, judging that the picture may not be filtered. A specific implementation process of the double-peak averaging algorithm is shown in table 3.

TABLE 3

| double-peak averaging algorithm |
| --- |
| Input: original picture array origin_pic, smoothing span u, smoothing number upper limit P |
| Output: filtered picture array shreshold_pic |
| get origin_pic[28][28] get picture data |
| traverse picture array to get gray scale distribution map which is represented by array gary[ ], value of ith array member representing occurrence number of pixel with gray value i |
| for i∈0,...,27 do |
| for j∈0,..., 27 do |
| get gray value of member of ith row and jth column: $G_{i,j}$=origin_pic[i][j] |
| add 1 to value of $G_{i,j}$th member of array gary: gary[$G_{i,j}$]+=1 |
| while picture gray scale distribution does not have two peak values do |
| for m∈0,...,255 do |
| take gary[m−u] and gary[m+u], solve average value gary_avg //perform smoothing operation on distribution map |
| gary[m]=gary_avg |
| if while execution number exceeds P then |
| judge that operation of double-peak averaging algorithm may not be performed on picture |
| retrun 0 |
| get two distribution peak values low_gary and high_gary on distribution map |
| Shreshold=(low_gary+high_gary)/2 take average value of two peak gray scales as filtering threshold |
| for a∈origin_pic do |
| if a<shreshold then |
| assign 0 to any member in the array //perform threshold filtering on picture |
| return shreshold_pic |

The double-peak valley bottom algorithm is different from the double-peak averaging algorithm in that after the gray values of two maximum frequencies are obtained, the two intermediate gray values are not taken, but a lowest valley between the two peaks is taken. The double-peak valley bottom algorithm includes: firstly processing an occurrence number of each gray value in the input picture into a form of a histogram, then performing double-peak judgment on the histogram, if yes, taking a gray value of the lowest valley between the two peaks as a threshold, filtering the picture using the threshold, if no, performing smoothing with a span of n on each data point, and meanwhile giving a smoothing number N, and if the upper limit N is exceeded, judging that the picture may not be filtered. A specific implementation process of the double-peak valley bottom algorithm is shown in table 4.

TABLE 4 double-peak valley bottom algorithm

Input: original picture array origin_pic, smoothing span u, smoothing number upper limit P
Output: filtered picture array shreshold_pic
get origin_pic[28][28] get picture data
traverse picture array to get gray scale distribution map which is represented by array gary[ ], value of ith array member representing occurrence number of pixel with gray value i
for i∈0,...,27 do
for j∈0,..., 27 do
get gray value of member of ith row and jth column: $G_{i,j}$=origin_pic[i][j]
add 1 to value of $G_{i,j}$th member of array gary: gary[$G_{i,j}$]+=1
while picture gray scale distribution does not have two peak values do
for m∈0,.. .,255 do
take gary[m−u] and gary[m+u], solve average value gary_avg//perform smoothing operation on distribution map
gary[m]=gary_avg
if while execution number exceeds 1,000 then
judge that operation of double-peak averaging algorithm may not be performed on picture
retrun 0
get two distribution peak values low_gary and high_gary on distribution map
take lowest gray value, i.e., valley value, of occurrence frequency between two peak values in distribution map, i.e., array
for a∈origin_pic do
if a<shresholdthen
assign 0 to any member in the array //perform threshold filtering on picture
returnshreshold _pic In this embodiment, the preset filtering algorithm most suitable for a scenario may be selected according to situations of the background and the target object.

A process of displaying data of a single pixel on an LCD is also a process of communicating the chip with the LCD through a serial peripheral interface (SPI). In order to utilize an MCU resource in the embedded system to the maximum extent, LCD display is point-by-point display; that is, the data of one pixel is directly displayed on the LCD after received completely, and a complete picture is displayed on the LCD only by occupying and repeatedly using the resource of a single pixel. A conventional LCD display pixel function means that each displayed pixel is positioned and then displayed; that is, a relative display position on the LCD is determined first, and then, a corresponding pixel is displayed, which is inefficient for a case where a designated region of the picture is repeatedly displayed a plurality of times. Each displayed pixel of the picture has a certain position continuous relationship with pixels displayed before and after the pixel, and the complete picture may be displayed without positioning each pixel.

Preferably, in this embodiment, the picture processing method further includes an LCD display acceleration step which includes: setting an LCD display region, and calling the SPI to directly send picture pixel data to the LCD. The point-by-point display process is changed into a process of firstly setting the LCD display region and then calling the SPI to directly send the pixel data to the LCD, avoiding a process of setting coordinates during each sending operation.

Preferably, in this embodiment, in the picture processing method, each picture data frame is processed using a fusion rolling convolution algorithm. The fusion rolling convolution algorithm includes five steps.

Step T1: acquiring pixel data in first (k+H) rows of a picture frame, and storing the pixel data in a corresponding two-dimensional array G[H+1][S], k∈[1,T−H−1]. A value of S is a single row size of the acquired data, and reception of the picture data is suspended by a corresponding control interface after the acquisition is finished.

Figure 3A:
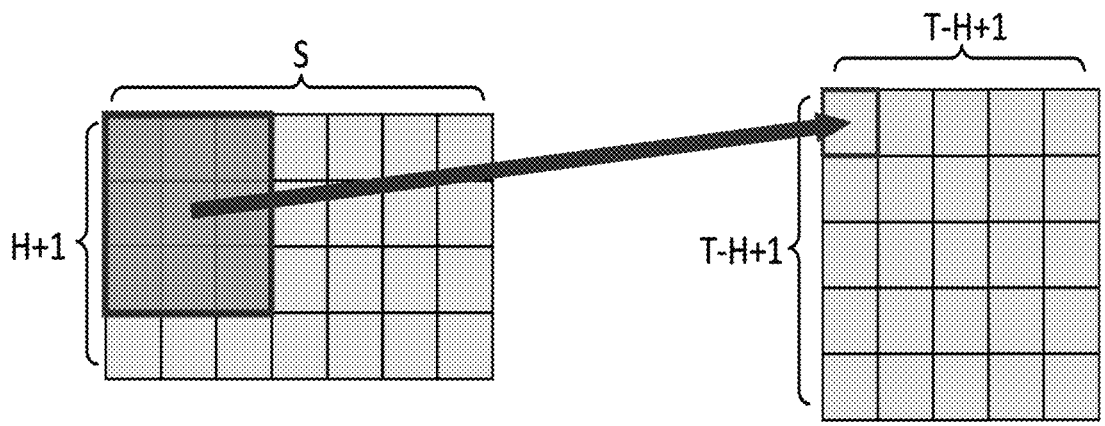
FIGS. 3(a), 3(b) and 3(c) are schematic diagrams of a fusion rolling convolution algorithm in the embodiment of the present invention.
Figure 3B:
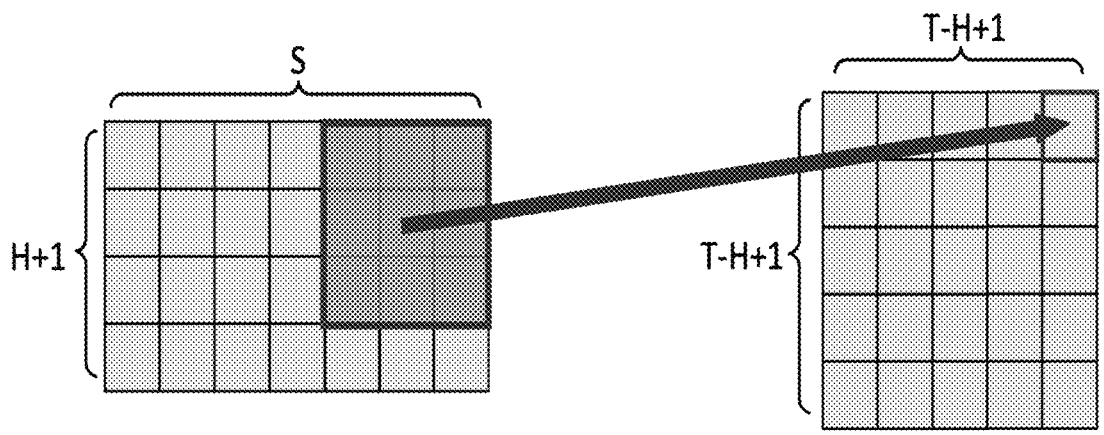

Step T2: performing a convolution operation using a convolution kernel A[H][H] and data from a kth row to a (k+H−1)th row of G, and storing an obtained feature layer array in the kth row of the feature layer array in sequence, as shown in FIGS. 3(a) and 3(b).

Figure 3C:
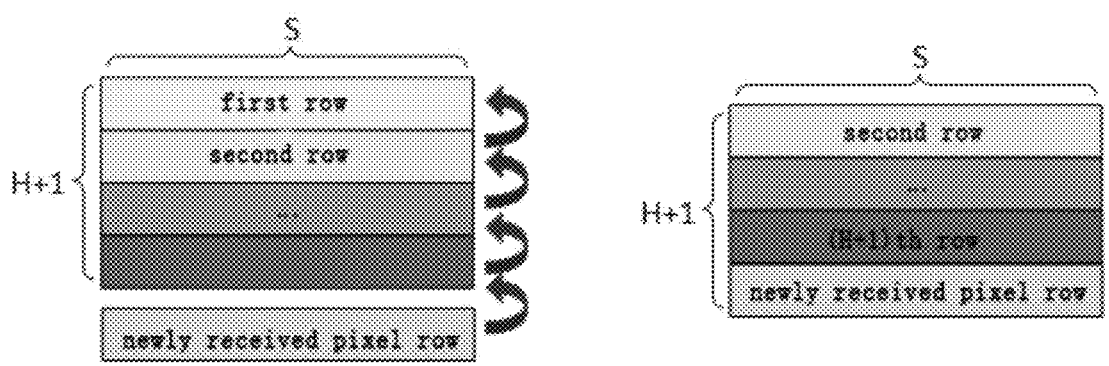

Step T3: exchanging members in the (k+1)th row to the (k+H)th row of the two-dimensional array G with members in the kth row to the (k+H)th row respectively; and sequentially exchanging elements in the adjacent kth row and (k+1)th row according to the sequence until all the elements are exchanged, and discarding the data in the original kth row, a specific exchange method being shown in FIG. 3(c).

Step T4: enabling a reading function of the cache chip, continuously reading picture data in a (k+H+1)th row, and storing the picture data in the (k+H)th row of G.

Step T5: increasing a value of k by 1, and repeating the steps T1, T2, T3 and T4 in sequence until convolution is completed to obtain a complete output array.

An object of the embodiment of the present invention is to provide the picture processing method conforming to characteristics of a memory of the embedded system, in which a driver of the camera module in the embedded system is optimized, and the picture data is compressed, so as to balance requirements for the occupied memory resource while increasing a picture collection speed and a picture data processing speed. Further, in the picture processing method, LCD display of the picture is accelerated by setting the LCD display region. Further, in the picture processing method, the fusion rolling convolution algorithm is adopted in the picture processing process, which effectively saves the memory space required to be occupied in the picture processing process, such that the picture processing process is more suitable for a situation of shortage of the memory resource of the embedded system.

It will be evident to those skilled in the art that the invention is not limited to the details of the foregoing illustrative embodiments, and that the present invention may be embodied in other specific forms without departing from the spirit or essential attributes thereof. The embodiments are therefore to be considered in all respects as illustrative and not restrictive, the scope of the invention is defined by the appended claims rather than by the foregoing description, and all changes which come within the meaning and range of equivalency of the claims are therefore intended to be embraced therein. Any reference numeral in a claim should not be construed as limiting the claim concerned.

Furthermore, it should be understood that although the specification is described in terms of the embodiments, not every embodiment only includes an independent technical solution, and such description of the specification is for clarity only; those skilled in the art should take the specification as a whole, and the technical solutions in various embodiments may also be appropriately combined to form other embodiments that may be understood by those skilled in the art.

What is claimed is:

1. A picture processing method in an embedded system, comprising:
    performing a bit setting operation on an input/output register corresponding to a communication GPIO port of a camera module in the embedded system, so as to improve a picture collection speed of the camera module;
    compressing a collected picture using a preset picture compression algorithm and transmitting the compressed picture to a picture preprocessing unit in the embedded system; and
    filtering out, by the picture preprocessing unit, a picture background using a preset filtering algorithm to obtain picture features of a target object in the picture;
    wherein in the picture processing method, each picture data frame is processed using a fusion rolling convolution algorithm which comprises:
    T1: acquiring pixel data in first (k+H) rows of a picture frame, and storing the pixel data in a corresponding two-dimensional array G[H+1][S], k∈[1,T−H−1], a value of S being a single row size of the acquired data, and reception of the picture data being suspended by a corresponding control interface after the acquisition is finished;
    T2: performing a convolution operation using a convolution kernel A[H][H] and data from a kth row to a (k+H−1)th row of G, and storing an obtained feature layer array in the kth row of the feature layer array in sequence;
    T3: exchanging members in the (k+1)th row to the (k+H)th row of the two-dimensional array G with members in the kth row to the (k+H)th row respectively; and sequentially exchanging elements in the adjacent kth row and (k+1)th row according to the sequence until all the elements are exchanged, and discarding the data in the original kth row;
    T4: enabling a reading function of a cache chip, continuously reading picture data in a (k+H+1)th row, and storing the picture data in the (k+H)th row of G; and
    T5: increasing a value of k by 1, and repeating the steps T1, T2, T3 and T4 in sequence until convolution is completed to obtain a complete output array.

2. The picture processing method in an embedded system according to claim 1, wherein when the camera module collects the picture, high 8-bit data of a pixel is read first, and then, and low 8-bit data of the pixel is read.

3. The picture processing method in an embedded system according to claim 1, wherein the picture compression algorithm comprises:
    cutting the collected picture to a preset standard size; and
    judging whether an input pixel with an ordinal number n is a target pixel, if yes, storing the pixel to a corresponding target two-dimensional array position Axy, and otherwise, discarding the pixel.

4. The picture processing method in an embedded system according to claim 1, further comprising an LCD display acceleration step which comprises: setting an LCD display region, and calling a serial peripheral interface to directly send picture pixel data to an LCD.

5. The picture processing method in an embedded system according to claim 1, wherein the preset filtering algorithm comprises an edge averaging algorithm, a double-peak averaging algorithm, and a double-peak valley bottom algorithm.

6. The picture processing method in an embedded system according to claim 5, wherein the edge averaging algorithm comprises: averaging all edge pixels to obtain an average value, and filtering the picture with the average value as a threshold.

7. The picture processing method in an embedded system according to claim 5, wherein the double-peak averaging algorithm comprises: firstly processing an occurrence number of each gray value in an input picture into a form of a histogram, then performing double-peak judgment on the histogram, if yes, taking an average value of double peaks as a filtering threshold, if no, performing smoothing with a span of n on each data point, and meanwhile giving a smoothing number N, and if the upper limit N is exceeded, judging that the picture may not be filtered.

8. The picture processing method in an embedded system according to claim 5, wherein the double-peak valley bottom algorithm comprises: firstly processing an occurrence number of each gray value in an input picture into a form of a histogram, then performing double-peak judgment on the histogram, if yes, taking a gray value of a lowest valley between two peaks as a threshold, filtering the picture using the threshold, if no, performing smoothing with a span of n on each data point, and meanwhile giving a smoothing number N, and if the upper limit N is exceeded, judging that the picture may not be filtered.

* * * * *